(12) United States Patent
Pfau et al.

(10) Patent No.: US 9,128,942 B1
(45) Date of Patent: Sep. 8, 2015

(54) ON-DEMAND OPERATIONS

(75) Inventors: Jeffrey Pfau, Chestnut Hill, MA (US); Devang K. Shah, San Jose, CA (US); Amber Palekar, Sunnyvale, CA (US); Ashish Prakash, RTP, NC (US)

(73) Assignee: NetApp, Inc., Sunnyvale, CA (US)

( * ) Notice: Subject to any disclaimer, the term of this patent is extended or adjusted under 35 U.S.C. 154(b) by 870 days.

(21) Appl. No.: 12/978,436

(22) Filed: Dec. 24, 2010

(51) Int. Cl.
*G06F 17/30* (2006.01)
*G06F 3/06* (2006.01)

(52) U.S. Cl.
CPC ........ *G06F 17/30091* (2013.01); *G06F 3/0629* (2013.01); *G06F 3/0647* (2013.01)

(58) Field of Classification Search
CPC . G06F 12/0638; G06F 12/08; G06F 12/0866; G06F 3/0607; G06F 3/0647; G06F 3/067; G06F 3/068; G06F 17/30091; G06F 3/0629
See application file for complete search history.

(56) References Cited

U.S. PATENT DOCUMENTS

| | | | | |
|---|---|---|---|---|
| 5,564,037 A | * | 10/1996 | Lam | 711/161 |
| 6,108,748 A | * | 8/2000 | Ofek et al. | 711/112 |
| 7,133,989 B2 | * | 11/2006 | Burton et al. | 711/162 |
| 7,206,819 B2 | * | 4/2007 | Schmidt | 709/214 |
| 2005/0216532 A1 | * | 9/2005 | Lallier | 707/204 |
| 2005/0251634 A1 | * | 11/2005 | Burton et al. | 711/162 |
| 2005/0278492 A1 | * | 12/2005 | Stakutis et al. | 711/161 |
| 2008/0052478 A1 | * | 2/2008 | Kubo et al. | 711/162 |
| 2010/0095075 A1 | * | 4/2010 | Ganesh et al. | 711/161 |
| 2010/0131728 A1 | * | 5/2010 | Miyamae et al. | 711/162 |
| 2010/0174690 A1 | * | 7/2010 | Marcotte | 707/695 |
| 2010/0257328 A1 | * | 10/2010 | Liu | 711/162 |

* cited by examiner

*Primary Examiner* — Shew-Fen Lin
(74) *Attorney, Agent, or Firm* — Cooper Legal Group, LLC

(57) ABSTRACT

Many applications and computing environments allow users to migrate data from a source object to a target object (e.g., a file may be cut/pasted, copied, etc.). It may be advantageous to provide users with access to the data (e.g., migrated data at the target object and/or data that has yet to be migrated from the source object) before all of the data is completely migrated (e.g., a user may otherwise have to wait hours for a 2 TB file to be copied between various data volumes). Accordingly, as provided herein, migration of a source object to a target object may be declared as completed, even though the target object may not comprise all of the data that is to be migrated. In this way, an I/O request may be satisfied based upon migrated data within the target object and/or data, not yet migrated, retrieved on-demand from the source object.

27 Claims, 9 Drawing Sheets

ON-DEMAND OPERATIONS

FIELD

The instant disclosure pertains to facilitating on-demand operations on a target data object, such as a file, migrated from a source data object, notwithstanding the target data object comprising less than all of the data of the source data object that is to be migrated from the source data object to the target data object.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented. For example, a cluster network environment of nodes may be implemented as a data storage system that facilitates the storage, retrieval, and/or processing of data. The data storage system may comprise one or more data storage devices configured to store user data within data volumes, for example. In this way, the user data may be stored, accessed, migrated, and/or processed within the data storage system.

Data may be frequently migrated (e.g., copied, cut/pasted, restored, replicated, backed up, etc.) within the data storage system and/or between data storage systems. In one example, a user may cut and paste files, folders, and/or directories from a first data volume to a second data volume. In another example, a data replication service may replicate a data volume across one or more nodes, such as computing devices, within the data storage system. In another example, a user may copy a file from a local data storage device to a mobile storage device, such as a flash drive. Unfortunately, migrating large amounts of data may consume resources (e.g., CPU utilization, processing time, network bandwidth, etc.). Additionally, the original data and/or the migrated data may be unavailable until the migration is completed (e.g., all data from the source data object is migrated to the target data object). For example, a user may migrate a source data volume comprising 2.5 TB of data from a source location to a target data volume at a target location. During the migration of the 2.5 TB of data, the source data volume and/or the target data volume may be unavailable (e.g., a user may be unable to read from and/or write to the 2.5 TB of data).

SUMMARY

This disclosure relates to one or more techniques and/or systems for facilitating on-demand operations at a data object level, such as at a file granularity. It may be appreciated that a source data object may comprise data that is to be migrated into a target data object (e.g., a source text document may be copied, cut/pasted, restored, replicated, etc. to create a target text document). Normally, the migration may be declared as completed once all of the data from the source data object is migrated into the target data object. During migration, the data may be unavailable to the user until the migration is complete (e.g., a user may be unable to read/write to the target data object because the target data object may not comprise all of the migrated data until the migration is completed). However, as provided herein, the migration may be declared as being completed before all of the data of the source data object is completely migrated into the target data object (e.g., the target text document may be declared as completely migrated even though the target text document may comprise less than all of the data that is to be migrated from the source text document into the target text document). In this way, the target data object may appear to be migrated and/or available to a user, even though less than all of the data has been migrated into the target data object (e.g., the target text document may comprise 1 MB out of 4.5 MB of data that is to be migrated from the source text document).

Accordingly, I/O requests, such as read/write requests, associated with a target data object may be performed before all of the data of a source data object is fully migrated into the target data object. If the I/O request is associated with migrated data comprised within the target data, then the I/O request may be satisfied by the migrated data within the target data object. If the I/O request is associated with data not yet migrated to the target data object, then an on-demand operation may be performed to retrieve the data from the source data object to satisfy the I/O request. For example, a target text document may comprise a first portion of data migrated from a source text document, but may not yet comprise a second portion of data that is to be migrated from the source text document. A read operation for the target text document may be associated with the second portion of data not yet migrated into the target text document. As provided herein, the read operation may be satisfied even though the target text document does not comprise the second portion of data because an on-demand operation may be performed to retrieve the second portion of data from the source text document. In particular, the second portion of data may be retrieved from the source text document on-demand to satisfy the read operation.

In one example, a request to migrate a source data object from a source location to a target location may be received. A target data object corresponding to the source data object may be generated. The target data object may initially comprise less than all of the data of the source data object. For example, the target data object may comprise information that the target data object is associated with the source data object, how to access the source data object, how to access a relationship between the source data object and the target data object, migrated data from the source data object, and/or other information regarding the migration. A relationship between the source data object and the target data object may be specified, which may describe the source data object, the target data object, and/or information regarding the migration, for example. The relationship may specify fetch information for the source data object (e.g., the fetch information may comprise a source path, such as a file system path, and/or a source data object handle, such as a file handle, used to access the source data object). It may be appreciated that the relationship may be used to fetch data from the source data object on-demand to satisfy an I/O request (e.g., read/write operations) for the target data object, where the data associated with the I/O request has yet to be migrated from the source data object to the target data object. The relationship may comprise an indication of what data has been migration and/or what data has yet to be migrated. For example, the relationship may maintain a block, multi-block, etc. level mapping that maps data blocks from the source data object to data blocks at the target data object (e.g., a source data object may comprise a plurality of data blocks having a one to one mapping with a plurality of data blocks of the target data object). As the target data object's data blocks are filled with migrated data from corresponding data blocks of the source data object, the block level mapping may be updated to indicate that such data blocks are filled.

The source data object may be declared as being migrated to the target location as the target data object notwithstanding the target data object comprising less than all of the data of the source object that is to be migrated from the source data object to the target data object. For example, the target data object may appear to a user as comprising 100% of the data of the source data object, even though the target data object may merely comprise 5% of the data that is to be migrated from the source data object to the target data object. In this way, the migration may appear to a user as occurring quicker than what the migration may otherwise take to complete (e.g., a move operation, such as a copy/paste operation, of a 2.5 TB file may appear to be migrated almost instantaneously). Thus, the user may perform I/O requests, such as read or write requests, on the target data object regardless of whether the target data object comprises data associated with the I/O requests. It may be appreciated that data may be migrated from the source data object to the target data object even though the migration may have been declared as completed (e.g., the remaining 95% of the source data may be migrated over time to the target data object as a background task).

In one example of satisfying an I/O request, a read request to access read data associated with a target data object may be received. If the target data object comprises the read data, then the read request may be satisfied using the read data from the target data object. If the target data object does not comprise the read data associated with the read request, then an on-demand operation may be performed to fetch the read data from a corresponding source data object. In particular, fetch information for the source data object may be determined from a relationship of the source data object and the target data object. For example, a source data object handle (e.g., a file handle) for the source data object may be used to locate and/or access the source data object to retrieve the read data that has not yet been migrated. In one example, an on-demand operation may be performed to retrieve the read data from the source data object to fill the target data object using the fetch information. The read request may be performed upon the read data filled within the target data object.

In another example, a write request to create written data associated with the target data object may be received. The write request may be performed upon the target data object to generate written data (e.g., which may or may not overwrite data already migrated or written to the target data object). An instruction may accompany the write request specifying not to overwrite the written data with subsequently migrated data from the source data object, where such an instruction may be specified within the relationship of the source data object and the target data object, for example. In this way, the user may perform write operations upon the target data object that may not be overwritten with subsequently migrated data from the source data object.

It may be appreciated that data from the source data object may be transferred (migrated) to the target data object in order to satisfy the migration request. In one example, the migration of data may occur without notification to a user that the migration is occurring. Instead, the user may be provided with an indication that the migration has been completed (e.g., the migration may be declared as completed), even though it may still be occurring. Additionally, an indication of the source data object may be removed from the source location. In this way, it may appear to a user that the migration of the source data object to the target data object has completed, even though data may still be pending for migration from the source data object to the target data object. Thus, user interactions with the target data object may be satisfied with on-demand operations without the user having to wait until the migration is fully completed.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
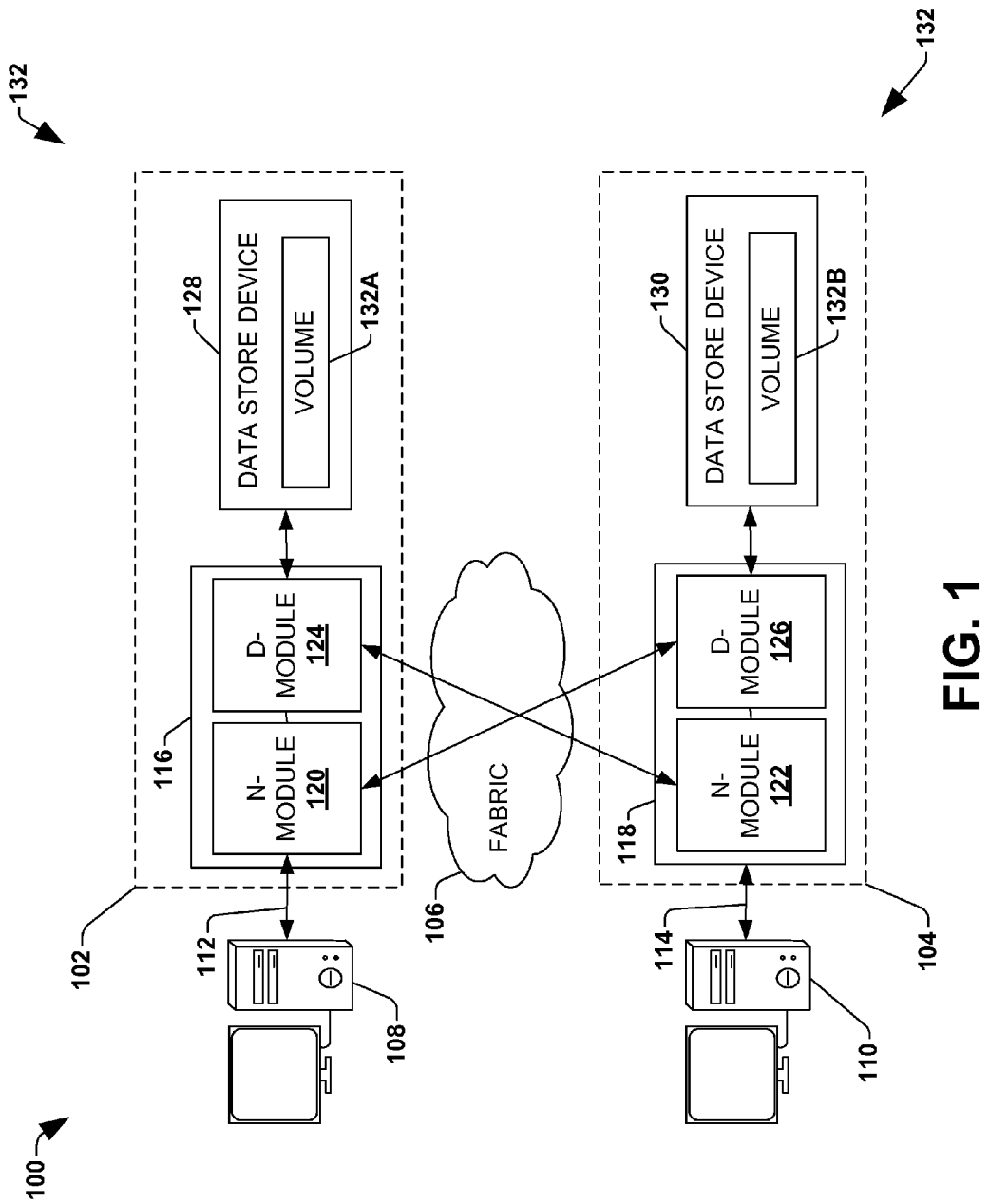
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Today, users may create, store, share, and/or utilize much information as electronic data. Consumers and business entities may store such data across various data volumes, data storage devices, and/or computing devices. For example, a cluster network environment may comprise a plurality of nodes configured to provide access to user data stored within data storage devices of the cluster network environment (e.g., data storage devices 128, 130 may comprise volumes 132 of user data as illustrated in FIG. 1). The stored data may be accessible through data operations, such as read or write operations. In one example, data may be migrated from a source location to a target location through a copy function, a cut/paste function, a replication function, a restore function, a cloning function (e.g., a single file clone operation), and/or through other functionality. Migration of large amounts of data may take a significant amount of time before completion (e.g., restoration of a backup file comprising 200 GB of data from a first data volume to a second data volume may take hours). Unfortunately, the migrated data (e.g., a source data object and/or a target data object) may be unavailable until the migration is completed. For example, a user may restore a 200 GB backup file from a storage server to a local client device. The user may have to wait until the migration of the entire 200 GB is completed before having access to the migrated backup file, regardless of whether the user merely wishes to access a small portion of the backup file (e.g., 10 MB portion).

Accordingly, one or more techniques and/or systems for facilitating data object level on-demand operations, which may be used to satisfy I/O requests, are provided herein. In particular, migration operations (e.g., copy, cut/paste, move, backup, restore, etc.) of a source data object to a target data object may be declared as completed before all of the data has been migrated. In this way, the migration operation may appear to be highly efficient to a user (e.g., the migration operation of large amounts of data may appear to be migrated almost instantaneously). Additionally, the target data object (e.g., migrated data within the target data object and/or data that has yet to be migrated to the target data object) may be available to the user even though the target data object may comprise less than all of the data from the source data object that is to be migrated (e.g., the target data object may comprise merely a few megabytes out of 2 gigabytes of data that is to be migration from the source data object). I/O requests from the user to access the data may be satisfied through on-demand operations that may fetch corresponding data from the source data object as necessary. For example, a read request may correspond to data that has yet to be migrated to a target data object, thus the data may be retrieved from the source data object to satisfy the read request. In this way, the user may read, write, and/or interact with the target data object notwithstanding the target data object comprising less than all of the data of the source data object that is to be migrated.

Figure 2:
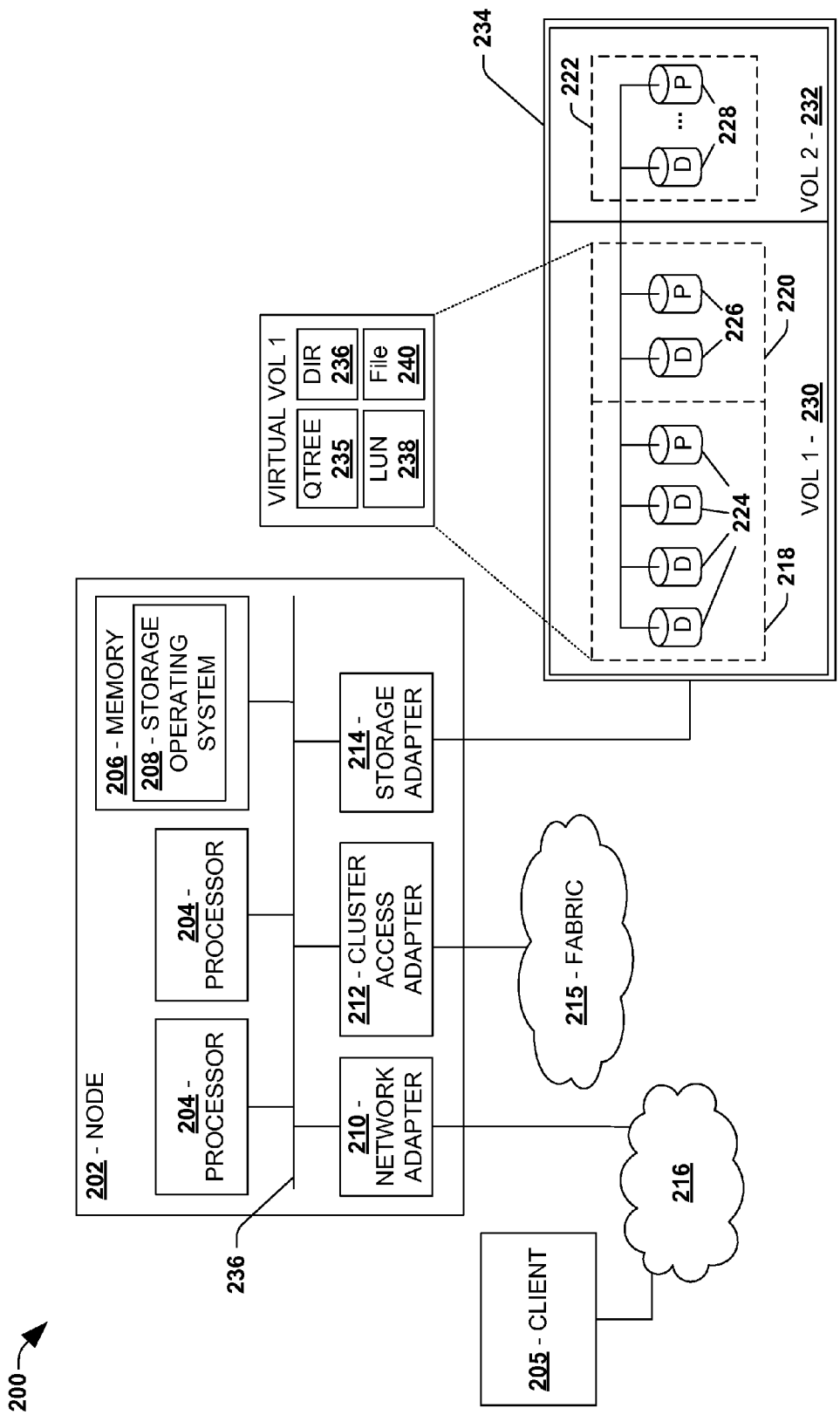
FIG. 2 is a component block diagram illustrating an example data storage system in accordance with one or more of the provisions set forth herein.

To provide a context for an embodiment for facilitating data object level on-demand operations, FIG. 1 illustrates a cluster network environment 100, for example, which may comprise source locations and target locations between which data may be migrated and/or on-demand operations may be performed to satisfy I/O requests, and FIG. 2 illustrates an embodiment of a data storage system that may be implemented to facilitate data migration and/or on-demand operations of data stored therein, for example. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

Among other things, one or more systems and/or techniques for facilitating data object level on-demand operations, such as at a file granularity, are disclosed herein. On-demand operations may be performed to retrieve data from a source data object that has yet been migrated to a target data object in order to satisfy an I/O request for the target data object. That is, a source data object may be migrated to a target data object. Before the data of the source data object is fully migrated to the target data object, the migration may be declared as completed even though the target data object may not comprise all of the data that is to be migrated. Thus, I/O requests for the target data object that involve data that has yet been migrated may be satisfied by performing an on-demand operation to retrieve the data from the source data object. In one example, such target data objects and/or source data objects may be stored within data storage system 200 of FIG. 2 and/or data storage systems 102, 104 of FIG. 1 (e.g., a source data object may be a file stored within a file system implemented within data storage system 200). Accordingly, the one or more systems and/or techniques disclosed herein may be implemented to facilitate on-demand operations to retrieve data stored within such data storage systems in order to satisfy I/O requests.

In one example of facilitating on-demand operations within cluster network environment 100 of FIG. 1, a client 108 may initiate a migration of a 200 GB source file from source volume 132B within source data store device 130 to target volume 132A within target data store device 128 (e.g., where the source and target volumes 132A, 132B are in different geographic locations and/or the data store devices 128, 130 are in different geographic locations). In particular, a target file corresponding to the source file may be generated within target volume 132A. The target file may initially comprise less than all of the 200 GB of data that is to be migrated from the source file to the target file (e.g., the target file may comprise 15 GB out of the 200 GB data that is to be migrated).

It may be advantageous to provide client 108 with access to the target file (e.g., located in San Francisco) without having to wait for the entire 200 GB of data to be migrated from the source file (e.g., located in San Diego) to the target file, which may take hours. Thus, the migration may be declared as completed even though 185 GB of data is still pending to be migrated from the source file to the target file. Accordingly, the user may perform I/O requests to read from and/or write to the target file (e.g., the entire 250 GB of data) regardless of whether the data has been migrated to the target file. I/O requests that may be satisfied by data migrated to the target file may be directed to the target file for execution. I/O requests corresponding to data that has yet to be migrated to the target file may be satisfied by retrieving the data on-demand from the source file.

Figure 3:
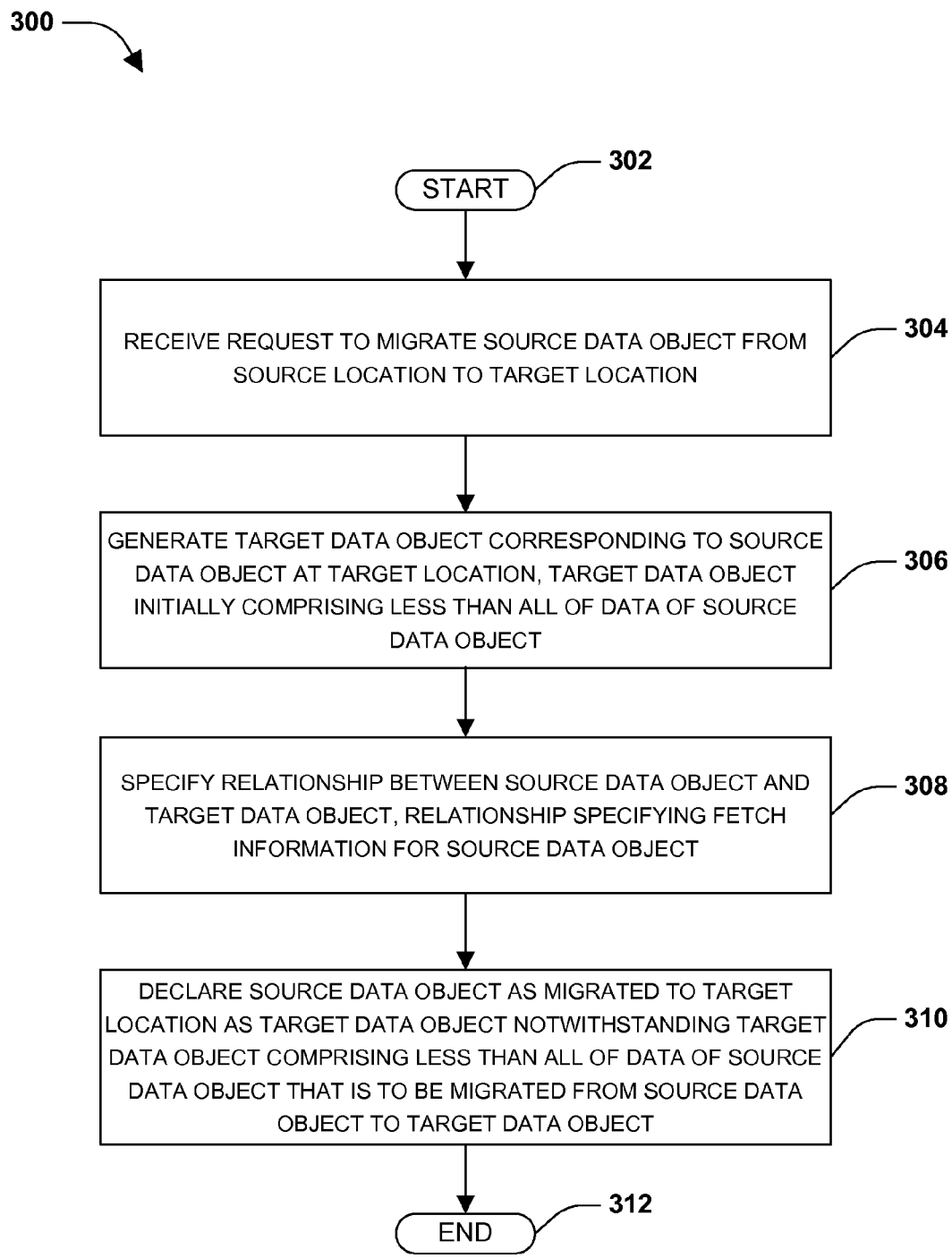
FIG. 3 is a flow chart illustrating an exemplary method of facilitating data object level on-demand operations.

One embodiment of facilitating data object level on-demand operations is illustrated by an exemplary method 300 at FIG. 3. At 302, the method starts. It may be appreciated that in one example, an I/O request may correspond to a read/write request for a target data object, and that an on-demand operation may be performed to retrieve data from a source data object that has yet to be migrated to the target data object in order to satisfy the I/O request. It may be appreciated that in one example, a source data object and/or a target data object may comprise a single file.

At 304, a request to migrate a source data object from a source location to a target location may be received. In one example, the request may be a source data object copy operation to copy a source data object at a source location to a target data object at a target location (e.g., a request to copy a source text file to a target text file). In another example, the request may be a source data object move operation to cut/paste a source data object at a source location to a target data object at a target location (e.g., a request to cut/paste a source spreadsheet file to a target spreadsheet file). In another example, the request may be a source data object restoration operation to restore a source data object at a source location to a target data object at a target location (e.g., a request to restore a source backup file to a target location).

It may be appreciated that the source data object may correspond to a source path (e.g., Volume A: dan\workfiles\backupfiles) and the target data object may correspond to a target path (e.g., Volume D: backup) different than the source path. In one example, the source path may correspond to a first volume and the target path may correspond to a second volume different than the first volume. Thus, on-demand operations may be performed to satisfy I/O requests for data objects, such as files, that are migrated between different volumes. In another example, the source path may correspond to a first computing device and the target path may correspond to a second computing device different than the first computing device. Thus, on-demand operations may be performed to satisfy I/O requests for data objects, such as files, that are migrated between different computing devices.

At 306, a target data object corresponding to the source data object may be generated at the target location. The target data object may initially comprise less than all of the data of the source data object. In one example, a request to migrate (e.g., cut/paste) a source spreadsheet file of 150 MB to a target spreadsheet file may be received. The target spreadsheet file may be generated, such that the target spreadsheet file may initially comprise 3 MB of data. For example, 3 MB of data may comprise data specifying that the target spreadsheet file is to be migrated from the source spreadsheet file, an indication that the target spreadsheet file comprises less than all of the data that is to be migrated, fetch information of the source spreadsheet file, location of a relationship corresponding to the migration, data migrated from the source spreadsheet file, and/or other information regarding the migration. It may be appreciated that the 150 MB may at some point be fully migrated from the source spreadsheet file to the target spreadsheet file to fully satisfy the migration request.

At 308, a relationship between the source data object and the target data object may be specified. The relationship may specify fetch information for the source data object and/or other information regarding the migration. In one example, the relationship may be specified within a data structure separate from the target data object, such as within a relationship mapping implemented as a B+ tree, for example. It may be appreciated that the relationship may be used to fetch data from the source data object on-demand to satisfy an I/O request to access (e.g., read/write) data associated with the target data object that has not yet been migrated from the source data object to the target data object.

At 310, the source data object may be declared as being migrated to the target location as the target data object notwithstanding the target data object comprising less than all of the data of the source data object that is to be migrated from the source data object to the target data object. For example, the target data object may appear to a user as comprising 100% of the data of the source data object, even though the target data object may merely comprise 5% of the data that is to be migrated from the source data object to the target data object. In one example, an indication of the target data object at the target location may illustrate the target data object as comprising the data of the source data object as though the migration was actually completed, even though the target data object may comprise less than all data of the source data object that is to be migrated. In another example, an indication of the source data object at the source location may be removed (e.g., if the migration operation comprises a cut/paste operation, then the indication of the source data object may be removed to illustrate to a user that the cut has been performed, even though not all of the data has yet been cut/migrated from the source data object).

It may be appreciated that data may be migrated from the source data object to the target data object even though the migration may have been declared as completed. In one example, data transfer may begin after the generation of the target data object. In another example, data transfer may be delayed until such data is requested by an on-demand operation. In another example, data transfer may be delayed until appropriate resources, such as bandwidth and/or processing power, are available.

Because the migration may have been declared as completed notwithstanding the target data object comprising less than all of the data of the source data object that is to be migrated, at 310, the target data object may appear to be accessible to a user (e.g., the target data object may appear to comprise 100% data of the source data object). Thus, the user may submit I/O requests for the target data object. In this way, read requests and/or write requests associated with the target data object may be satisfied based upon data within the target data object and/or data within the source data object fetch by on-demand operations to the source data object. In one example, a read operation for data that has already been migrated to the target data object may be satisfied with the migrated data within the target data object. In another example, a read operation for data that has not yet been migrated to the target data object may be satisfied by fetching the data from the source data object using an on-demand operation, which may utilize the relationship between the target data object and the source data object (e.g., the relationship may specify fetch information that may be used to retrieve the data from the source data object).

In one example of a read request for data that has not yet been migrated to the target data object, the read request associated with the target data object may be received. It may be determined that the target data object does not comprise read data associated with the read request. For example, the target data object may comprise an indication that the read data has not yet been migrated from the source data object to the target data object. Fetch information for the source data object comprising the read data may be determined from the relationship of the target data object and the source data object (e.g., the fetch information may comprise a source data object handle, such as a file handle, of the source data object, such as a source file). An on-demand operation may be performed to fill the target data object with the read data from the source data object based upon the fetch information. The read request may be performed upon the read data filled within the target object. In this way, the read request associated with the target data object may be satisfied, even though the target data object may not initially comprise the read data.

In one example of a read request for data that has been migrated to the target data object, the read request associated with the target data object may be received. It may be determined that the target data object may comprise read data associated with the read request. For example, the read data may have been migrated to the target data object from the source data object. The read request may be performed upon the read data within the target data object.

In one example of a write request associated with data that has not yet been written to the target data object from the source data object, the write request associated with the target data object may be received. In one example, it may be determined that the write request is associated with data that has yet to be written to the target data object from the source data object. The write request may be performed upon the target data object to generate written data. Because the written data may be more up-to-date (less stale) than corresponding data within the source data object that is to be migrated to the target data object, it may be specified within the relationship that migrated data from the source data object is not to overwrite the written data. In this way, the user may write data to the target data object without the written data being overwritten by stale data that has yet to be migrated to the target data object from the source data object.

In one example of a write request corresponding to data that has been migrated to the target data object, the write request associated with the target data object may be received. In one example, it may be determined that the write request is associated with data that has been migrated to the target data object from the source data object. The write request may be performed upon the target data object to generate written data (e.g., new data may be generated within the target data object or migrated data within the target data object may be overwritten by the write request). In this way, the user may write data to the target data object even though the target data object may not comprise all of the data of the source data object that is to be migrated (e.g., 60% of the source data object may be pending data that has yet to be migrated to the target data object).

At 312, the method ends.

In another embodiment of facilitating on-demand operations, a request to access a portion of a target data object may be received. A determination that the target data object may be associated with a migration operation may be made based upon the target data object comprising at least one absent, empty, null, etc. data block. That is, the target data object may be associated with a migration operation where data of a source data object may be migrated into the target data object (e.g., a cut/paste operation of the source data object to the target data object). However, the target data object may comprise absent data blocks if some of the data that is to be migrated has not yet been migrated (e.g., approximately 15% data of the source data object has been migrated to the target data object, such that approximately 85% data of the source data object has yet to be migrated, and thus the target data object may comprise approximately 85% absent data blocks and approximately 15% filled data blocks). It may be appreciated that a relationship may have been specified between the migration of the source data object and the target data object. The relationship may comprise a source path of the source data object, which may be used to locate and access the source data object. In one example, the target data object may comprise an indication of the relationship (e.g., the target data object may specify that the target data object is associated with the migration operation and that a relationship exists that may be used to determine additional information regarding the migration operation).

In one example, if the requested portion corresponds to one or more absent data blocks (e.g., a block of data at the target data object that has not yet been filled with migrated data from the source data object) and the request corresponds to a read request, then a relationship associated with the migration operation between the source data object and the target data object may be consulted (e.g., a user may request to access/read data from the target data object that has not yet been migrated the target data object, and thus an on-demand operation may be performed to fulfill the read request with data from the source data object). The target data object may comprise an indication and/or location for the relationship. The relationship may be consulted to determine the source path of the source data object, which may be used to access the source data object. The read request may be satisfied by performing an on-demand operation to retrieve data associated with the one or more absent data blocks from the source data object using the source path. The retrieved data from the source data object may be used to fill at least some of the one or more absent data blocks within the target data object. The filled data may be used to satisfy the read request.

If the requested portion corresponds to one or more absent data blocks and the request correspond to a write request, then the write request may be performed upon the target data object to generate written data. An indication that migrated data from the source data object is not to overwrite the written data may be specified within the relationship.

If the requested portion corresponds to one or more filled data blocks and the request corresponds to a write request, the write request may be performed upon the target data object to generate written data within the filled data blocks (e.g., an overwrite operation).

It may be appreciated that data may be migrated from the source data object to the target data object in various manners. In one example, data may be migrated over time (e.g., a background task may migrate data). In another example, data may be migrated in response to on-demand operations. It may be appreciated that in one example, the migration of data may be tracked at various granularities within the relationship (e.g., a percentage of data migration may be tracked; particular blocks of migrated data may be tracked; etc.). In this way, the relationship may be updated as data migration occurs. Additionally, the relationship may be used to prioritize the order of data migration.

Figure 4:
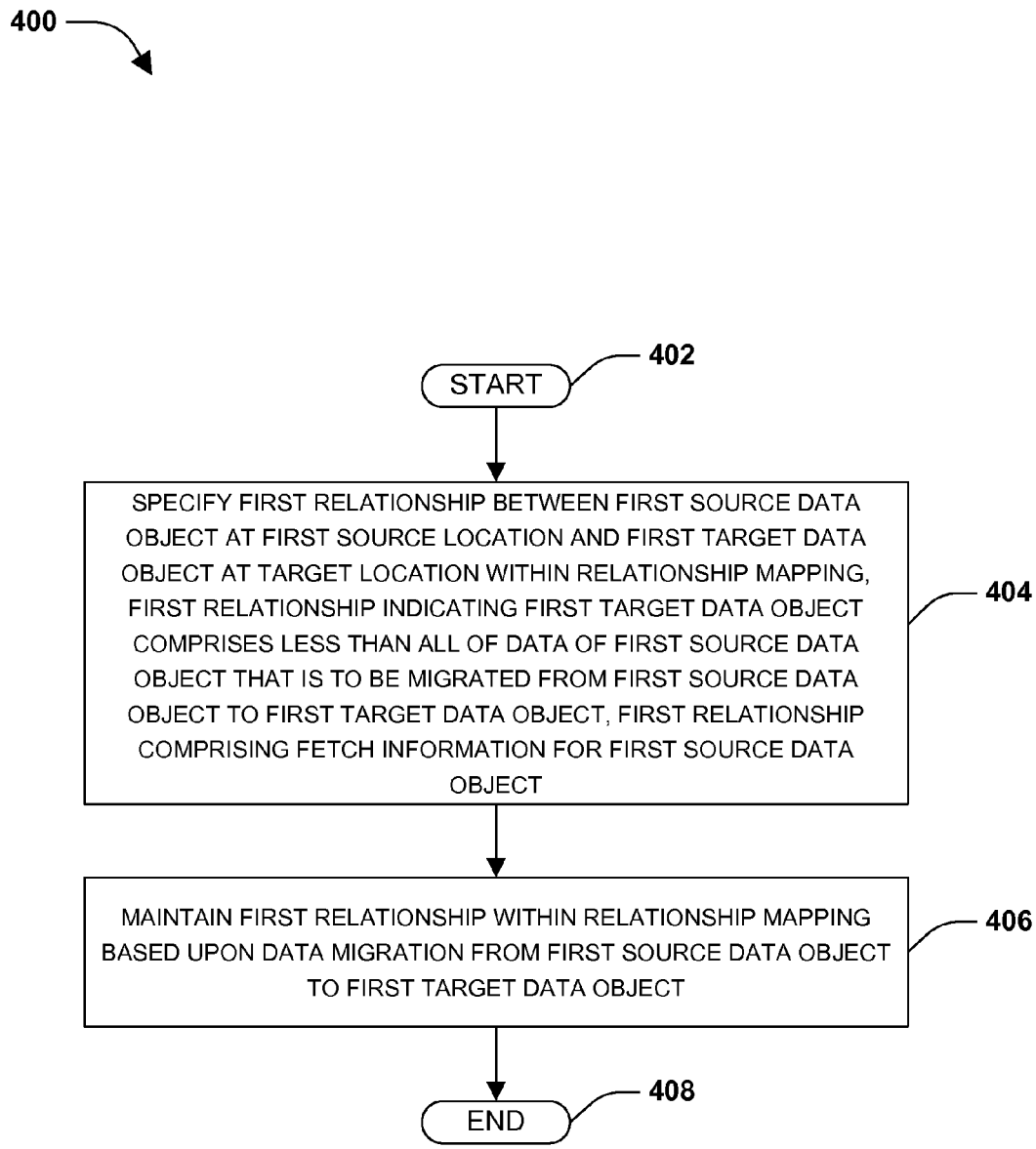
FIG. 4 is a flow chart illustrating an exemplary method of maintaining a relationship mapping at a target location.

One embodiment of maintaining a relationship mapping at a target location is illustrated by an exemplary method 400 at FIG. 4. At 402, the method starts. At 404, a first relationship between a first source data object (e.g., a first backup file) at a first location and a first target data object at a target location may be specified within a relationship mapping. It may be appreciated that the first source data object and the first target data object may be associated with a migration request to migrate the first source data object to the first target data object (e.g., copy, cut/paste, restore, etc.). The first relationship may indicate that the first target data object comprises less than all of the data of the first source data object that is to be migrated from the first source data object to the first target data object. That is, the migration may be declared as being completed even though there may be pending data that has yet to be migrated from the source data object to the target data object. In this way, the migration may appear to be highly efficient to a user (e.g., the migration may appear to be completed almost instantaneously even though merely a portion of the data may be migrated so far). It may be appreciated that the pending data may at some point be migrated from the first source data object to the first target data object to fully satisfy the migration request. The first relationship may comprise fetch information for the first source data object. It may be appreciated that the first relationship, such as the fetch information, may be used to fetch data from the first source data object on-demand to satisfy an I/O request for the first target data object involving data that has not yet been migrated from the first source data object to the first target data object.

At 406, the first relationship may be maintained (e.g., accessed, updated, deleted, etc.) within the relationship mapping based upon data migration from the first source data object to the first target data object. In one example, the first relationship may provide an indication of what data has been migrated from the first source data object to the first target data object and/or what data has yet to be migrated from the first source data object to the first target data object (e.g., a block level mapping). The first relationship may be consulted to determine which blocks of data of the first target data object have been filled with migrated data and/or which blocks of data of the first target data object have yet to be filled with migrated data. In this way, the first relationship may be consulted to determine whether data associated with an I/O request has been migrated or not. In another example, what data is already migrated from the source data object to the target data object and what data has not yet been migrated may be stored within a volume (e.g., comprising the target data object) by marking particular blocks accordingly (e.g., as either migrated or not).

It may be appreciated that I/O requests for the first target data object may be performed regardless of whether the first target data object comprises all of the data of the first source data object that is to be migrated from the first source data object to the first target data object. That is, the migration may be declared as completed (even though even though there may be pending data to migrate in order to fully satisfy a migration request), such that the user may perform I/O requests that may be satisfied based upon data within the first target data object and/or data within the first source object retrieved on-demand. In one example, an I/O request for the first target data object may be directed to the first target data object based upon determining within the first relationship that the first target data object comprises data associated with the I/O request (e.g., a write request, a read request associated with data already migrated to the first target data object, and/or other requests that may be satisfied through access to the first target data object). In another example, an I/O request for the first target data object may be directed to the first source data object based upon determining within the first relationship that the first target data object does not comprise data associated with the I/O request (e.g., a read request associated with data that has yet to be migrated to the first target data object). The I/O request may be facilitated (satisfied) by fetching the data from the first source data object based upon the fetch information for the first source data object. Additionally, the first target data object may be filled with the fetched data, thus advancing the migration of the first source data object to the first target data object.

It may be appreciated that an I/O request may correspond to data associated with the first target data object (e.g., data already migrated to the first target data object) and data associated with the first source data object (e.g., data that has yet to be migrated to the first target data object). Such an I/O request may be satisfied based upon directing the I/O request to the first target data object and to the first source data object.

It may be appreciated that one or more relationships may be maintained within the relationship mapping (e.g., one or more source data objects may be migrated to target data objects at the target location). In one example, a second relationship between a second source data object at a second source location and a second target data object at the target location may be specified within the relationship mapping. The second relationship may indicate that the second target data object comprises less than all of the data of the second source data object. The second relationship may comprise fetch information for the second source data object. The second relationship may be maintained within the relationship mapping based upon data migration from the second source data object to the second target data object. It may be appreciated that the second relationship may be used to fetch data from the second source data object on-demand to satisfy a request to access (e.g., read/write) data associated with the second target data object that has not yet been migrated from the second source data object to the second target data object. It may be appreciated that the first source location and the second source location may be different locations. For example, the first relationship may correspond to a first source backup file located within a first data volume and the second relationship may correspond to a second source backup file located within a second data volume different than the first data volume.

In another example, a third relationship between a third source data object at the first (and/or a different) source location (e.g., the first source location comprising the first source data object) and a third target data object at the target location may be specified within the relationship mapping. The third relationship may indicate that the third target data object comprises less than all of the data of the third source data object. The third relationship may comprise fetch information for the third source data object. The third relationship within the relationship mapping may be maintained based upon data migration from the third source data object to the third target data object. It may be appreciated that the third relationship may be used to fetch data from the third source data object on-demand to satisfy a request to access (e.g., read/write) data associated with the third target data object that has not yet been migrated from the third source data object to the third target data object.

In one example of a relationship mapping, the relationship mapping may comprise a tree structure (e.g., a data structure, a B+ tree, etc.). The tree structure may comprise source data object handles (e.g., file handles used to access files) as indexes for respective relationships within the relationship mapping. At 408, the method ends.

Figure 5:
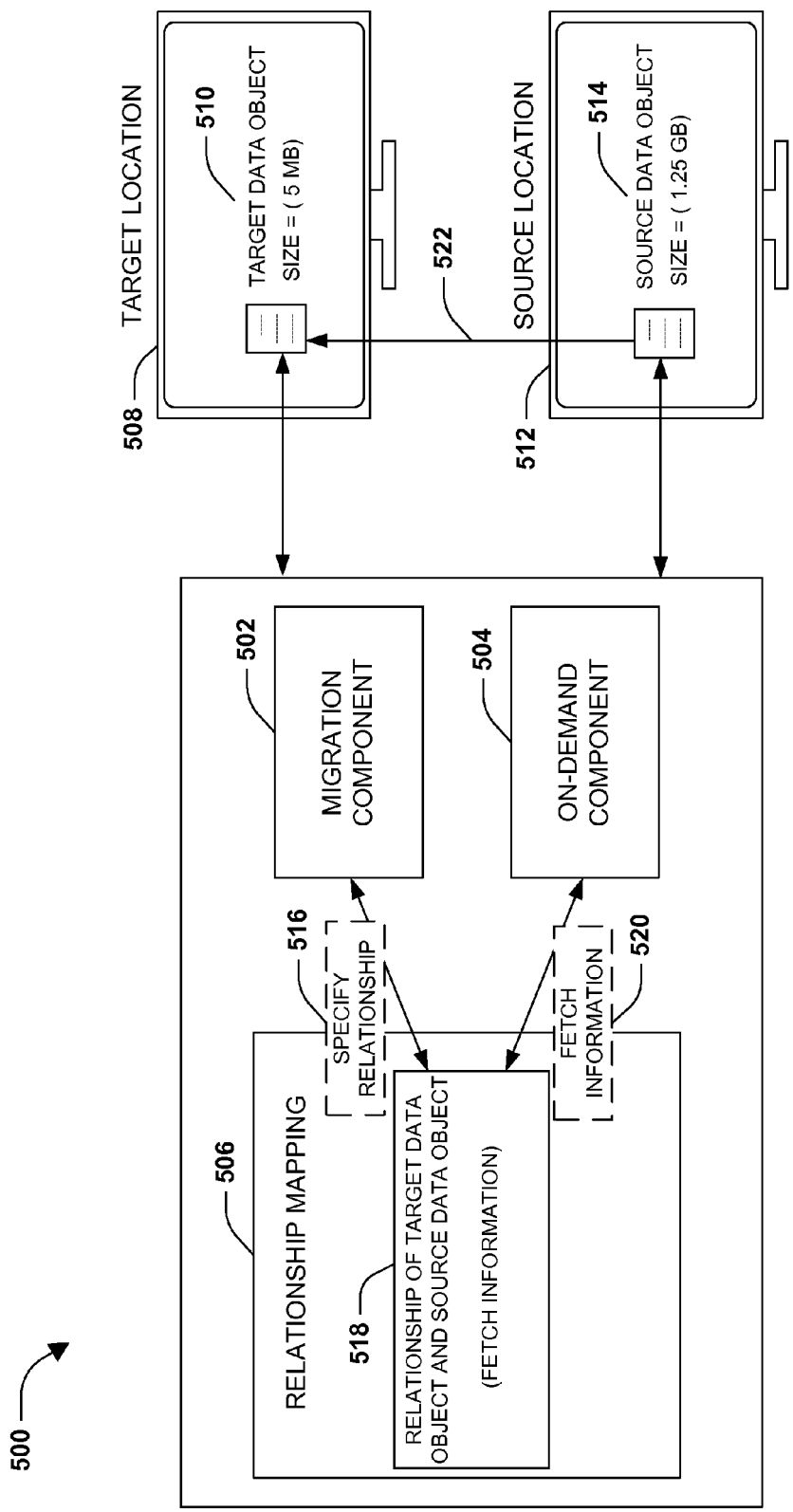
FIG. 5 is a component block diagram illustrating an exemplary system for facilitating data object level on-demand operations.

FIG. 5 illustrates an example of a system 500 configured to facilitate data object level on-demand operations. The system 500 may comprise a migration component 502 and/or an on-demand component 504. The migration component 502 may be configured to receive a request to migrate 522 a source data object 514 (e.g., a 1.25 GB single file) from a source location 512 to a target location 508. In one example, the source location 512 may correspond to a first volume and the target location 508 may correspond to a second volume different than the first volume. The migration component 502 may generate a target data object 510 at the target location 508. The target data object 510 may correspond to the source data object 514 (e.g., the target data object 510 may be a copy of the source data object 514).

The target data object 510 may initially comprise less than all of the data of the source data object 514 (e.g., the target data object 510 may comprise 5 MB out of 1.25 GB of data from the source data object 514 that is to be migrated). The migration component 502 may be configured to declare the source data object 514 as migrated to the target location 508 as the target data object 510 notwithstanding the target data object 510 comprising less than all of the data of the source data object 514 that is to be migrated from the source data object 514 to the target data object 510. That is, the migration 522 may be declared as being completed even though there may be pending data to migrate from the source data object 514 to the target data object 510. In this way, the migration 522 may appear to be highly efficient to a user (e.g., the migration 522 may appear to be completed almost instantaneously even though merely a portion of the data may be migrated so far). It may be appreciated that the pending data may at some point be migrated 522 from the source data object 514 to the target data object 510 to fully satisfy the migration request. That is, the pending data may be migrated 522 from the source data object 514 to the target data object 510 even though the migration may have been declared as completed.

The migration component 502 may specify 516 a relationship 518 between the target data object 510 and the source data object 514. For example, the relationship 518 may be specified 516 within a relationship mapping 506. The relationship 518 may specify fetch information for the source data object 514 (e.g., a file handle that may be used to access the source data object 514). It may be appreciated that the relationship 518 may be used to fetch data from the source data object 514 on-demand to satisfy a request to access (e.g., read/write) data associated with the target data object 510 that has not yet been migrated from the source data object 514 to the target data object 510.

In one example, the on-demand component 504 may be configured to receive a read request associated with the target data object 510. The on-demand component 504 may determine that the target data object 510 does not comprise read data associated with the read request. The on-demand component 504 may determine fetch information 520 for the source data object 514 comprising the read data based upon the relationship 518. The on-demand component 504 may perform an on-demand operation to fill the target data object 510 with the read data from the source data object based upon the fetch information 520. In this way, the target data object 510 may comprise the read data associated with the read request. The on-demand component 504 may perform the read request upon the read data filled within the target data object 510.

In another example, the on-demand component 504 may be configured to receive a write requested associated with the target data object 510. The on-demand component 504 may perform the write request upon the target data object 510 to generate written data. The on-demand component 504 may specify within the relationship 518 that migrated data from the source data object 514 is not to overwrite the written data. In this way, the write request may be perform locally to the target data object 510 without being overwritten by migrated data (e.g., stale data) during subsequent migration.

Figure 6:
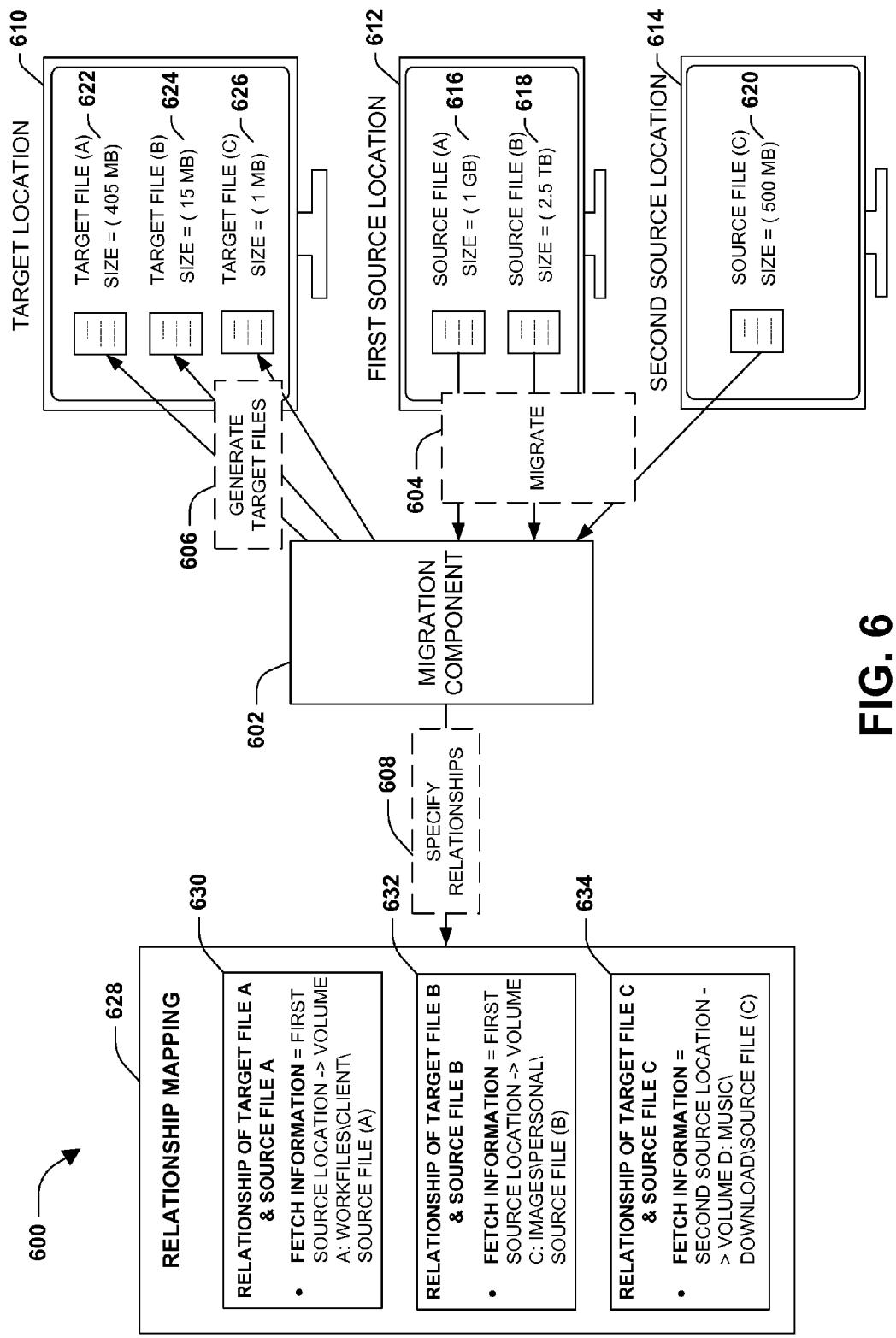
FIG. 6 is an illustration of an example of a migration component migrating source files to target files and specifying relationships between respective source and target files.

FIG. 6 illustrates an example 600 of a migration component 602 migrating 604 source files to target files and specifying relationships 608 between respective source and target files. A first source location 612, such as a first data volume, may comprise source file (A) 616, source file (B) 618, and/or other files. Source file (A) 616 may comprise 1 GB of data. Source file (B) 618 may comprise 2.5 TB of data. A second source location 614 may comprise a source file (C) 620 and/or other files. Source file (C) 620 may comprise 500 MB of data. In one example, the first source location, the second source location, and/or the target location may be different locations, such as different data volumes.

In one example, the migration component 602 may receive a request to migrate source file (A) 616 from the first source location 612 to target location 610 (e.g., migration 604). The migration component 602 may generate target file (A) 622 at the target location 610 (e.g., generate target files 606). The target file (A) 622 may initially comprise less than all of the date of the source file (A) 616 that is to be migrated from the source file (A) 616 to the target file (A) 622 (e.g., target file (A) 622 may comprise 405 MB out of 1 GB of data that is to be migrated). The migration component 602 may declare the migration of source file (A) 616 to target file (A) 622 as completed notwithstanding the target file (A) 622 as comprising less than all of the data of the source file (A) 616 that is to be migrated. In this way, it may appear to a user that target file (A) 622 is accessible because the migration was declared as complete even though the migration is not actually complete (e.g., the pending 595 MB of data may be migrated to the target file (A) 622 to actually complete the migration). The migration component 602 may specify a relationship 630 of target file (A) 622 and source file (A) 616 within a relationship mapping 628. The relationship may comprise fetch information, such as a file handle for the source file (A) 616, which may be used to access the source file (A) 616 to satisfy I/O requests associated with target file (A) 622 corresponding to data that has yet to be migrated from source file (A) 616 to target file (A) 622.

In another example, the migration component 602 may receive a request to migrate source file (B) 618 from the first source location 612 to target location 610 (e.g., migration 604). The migration component 602 may generate target file (B) 624 at the target location 610 (e.g., generate target files 606). The target file (B) 624 may initially comprise less than all of the date of the source file (B) 618 that is to be migrated from the source file (B) 618 to the target file (B) 624 (e.g., target file (B) 624 may comprise 15 MB out of 2.5 TB of data that is to be migrated). The migration component 602 may declare the migration of source file (B) 618 to target file (B) 624 as completed notwithstanding target file (B) 624 comprising less than all of the data of the source file (B) 618 that is to be migrated. In this way, it may appear to a user that target file (B) 624 is accessible because the migration was declared as complete even though the migration is not actually complete (e.g., the pending 2.5 TB of data may be migrated to the target file (B) 624 to actually complete the migration). The migration component 602 may specify a relationship 632 of target file (B) 624 and source file (B) 618 within a relationship mapping 628. The relationship may comprise fetch information, such as a file handle for the source file (B) 618, which may be used to access the source file (B) 618 to satisfy I/O requests associated with target file (B) 624 corresponding to data that has yet to be migrated from source file (B) 618 to target file (B) 624.

In another example, the migration component 602 may receive a request to migrate source file (C) 620 from the second source location 614 to target location 610 (e.g., migration 604). The migration component 602 may generate target file (C) 626 at the target location 610 (e.g., generate target files 606). The target file (C) 626 may initially comprise less than all of the date of the source file (C) 620 that is to be migrated from the source file (C) 620 to the target file (C) 626 (e.g., target file (C) 626 may comprise 1 MB out of 500 MB of data that is to be migrated). The migration component 602 may declare the migration of source file (C) 620 to target file (C) 626 as completed notwithstanding target file (C) 626 comprising less than all of the data of the source file (C) 620 that is to be migrated. In this way, it may appear to a user that target file (C) 626 is accessible because the migration was declared as complete even though the migration is not actually complete (e.g., the pending 499 MB of data may be migrated to the target file (C) 626 to actually complete the migration). The migration component 602 may specify a relationship 634 of target file (C) 626 and source file (C) 620 within a relationship mapping 628. The relationship may comprise fetch information, such as a file handle for the source file (C) 620, which may be used to access the source file (C) 620 to satisfy I/O requests associated with target file (C) 626 corresponding to data that has yet to be migrated from source file (C) 620 to target file (C) 626.

In one example, a relationship within the relationship mapping 628 may comprise a mapping that maps data, such as at a block, multi-block, etc. granularity, of a source file to data of a target file. The mapping may indicate which blocks of data of the target file have been filled with migrated data and/or which blocks of data of the target file have yet to be filled with migrated data. In this way, the relationship may be used to determine whether an I/O request may be satisfied with migrated data at the target file and/or with data that has yet to be migrated from the source file. In another example, a relationship may comprise an IP address, a host name, and/or a computing device identifier (e.g., a cluster wide node identifier) of a source location comprising a source data object.

Figure 7:
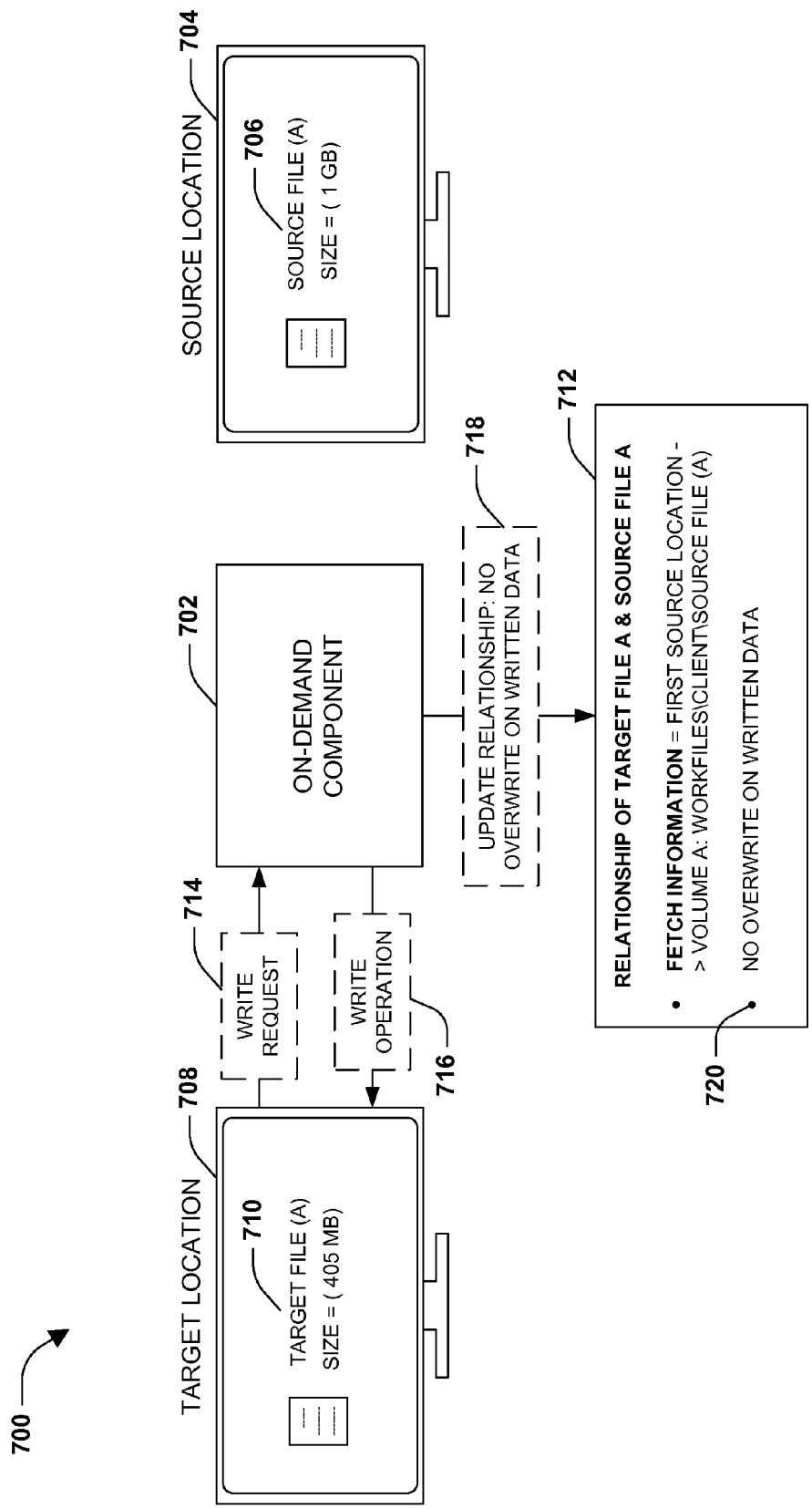
FIG. 7 is an illustration of an example of an on-demand component facilitating a write request associated with a target file.

FIG. 7 illustrates an example 700 of an on-demand component 702 facilitating a write request 714 associated with a target file (A) 710. It may be appreciated that the target file (A) 710 may correspond to source file (A) 706 at source location 704. In particular, target file (A) 710 may have been generated at target location 708 in response to a request to migrate source file (A) 706 to target file (A) 710 (e.g., move, cut/paste, copy, restore, backup, etc.). The migration of source file (A) 706 to target file (A) may have been declared as completed even though the target file (A) 710 may not comprise all of the data of source file (A) 706 that is to be migrated from source file (A) 706 to target file (A) 710. For example, 405 MB out of 1 GB of data may have been migrated from source file (A) 706 to target file (A) 710, such that 595 MB of data may still be pending for migration. In this way, the target file (A) 710 may appear to be accessible and/or completely migrated even though pending data has yet to be migrated from source file (A) 706 to target file (A) 710 (e.g., an indication of source file (A) 706 may be removed from source location 704 and/or target file (A) 701 may appear to comprise the entire 1 GB of data). Additionally, a relationship 712 between target file (A) 710 and source file (A) 706 may have been specified. The relationship 712 may comprise fetch information for source file (A) 706, which may be used to access the source file (A) 706 to satisfy I/O requests associated with target file (A) 710 corresponding to data that has yet to be migrated from source file (A) 706 to target file (A) 710.

The on-demand component 702 may receive the write request 714 associated with target file (A) 710 (e.g., a user may request to write new data to the target file (A) 710, the user may request to overwrite data to the target file (A) 710 that may or may not be migrated so far). The on-demand component 702 may perform the write request (write operation 716) to generate written data. The on-demand component 702 may update 718 the relationship 712 with a specification 720 that migrated data from the source file (A) 706 is not to overwrite the written data. In this way, a user may access and/or write to the target file (A) 710 even though target file (A) 710 may not comprise all of the data that is to be migrated from the source file (A) 706 to the target file (A) 710.

Figure 8:
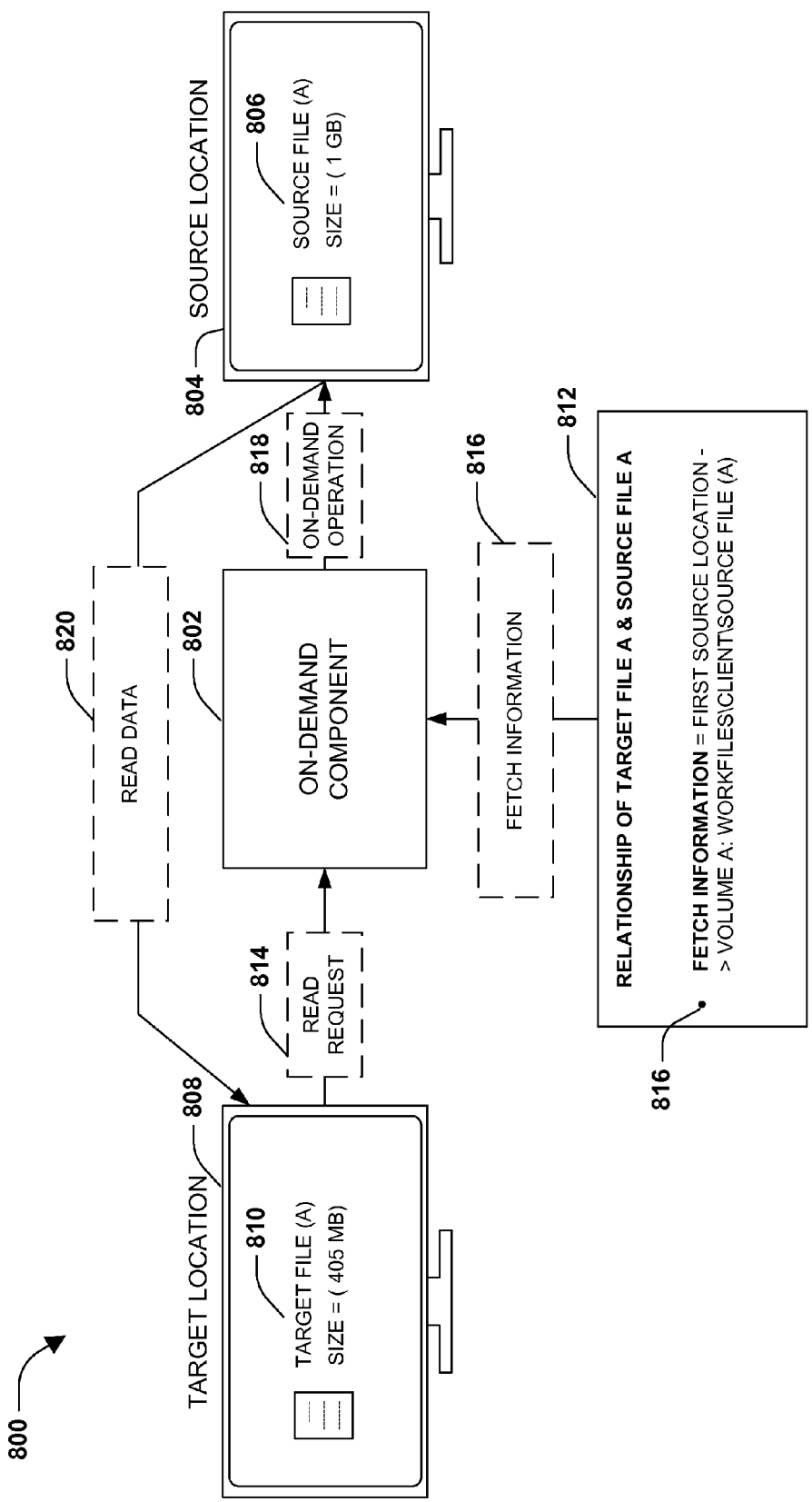
FIG. 8 is an illustration of an example of an on-demand component facilitating a read request associated with a target file.

FIG. 8 illustrates an example 800 of an on-demand component 802 facilitating a read request 814 associated with a target file (A) 810. It may be appreciated that the target file (A) 810 may correspond to source file (A) 806 at source location 804. In particular, target file (A) 810 may have been generated at target location 808 in response to a request to migrate source file (A) 806 to target file (A) 810 (e.g., move, cut/paste, copy, restore, backup, etc.). The migration of source file (A) 806 to target file (A) 810 may have been declared as completed even though the target file (A) 810 may not comprise all of the data of source file (A) 806 that is to be migrated from source file (A) 806 to target file (A) 810. For example, 405 MB out of 1 GB of data may have been migrated from source file (A) 806 to target file (A) 810, such that 595 MB of data may still be pending for migration. In this way, the target file (A) 810 may appear to be accessible and/or completely migrated even though pending data has yet to be migrated from source file (A) 806 to target file (A) 810 (e.g., an indication of source file (A) 806 may be removed from source location 804 and/or target file (A) 801 may appear to comprise the entire 1 GB of data). Additionally, a relationship 812 between target file (A) 810 and source file (A) 806 may have been specified. The relationship 812 may comprise fetch information 816 for source file (A) 806, which may be used to access the source file (A) 806 to satisfy I/O requests associated with target file (A) 810 corresponding to data that has yet to be migrated from source file (A) 806 to target file (A) 810.

The on-demand component 802 may receive the read request 814 associated with the target file (A) 810. In one example, the on-demand component 802 may determine that the target file (A) 810 comprises read data associated with the read request 814, and thus may satisfy the read request 814 by provided access to the read data within the target file (A) 810. In another example, the on-demand component 802 may determine that the target file (A) 810 does not comprise read data 820 associated with the read request 814. Thus, the read data 820 may be comprised within the source file (A) 806. The on-demand component 802 may retrieve fetch information 816 from the relationship 812 of the target file (A) 810 and the source file (A) 806. The fetch information 816 may be used to access the read data 820 within the source file (A) 806. The on-demand component 802 may perform an on-demand operation 818 to fill the target file (A) 810 with the read data 820 form the source file (A) 806 based upon the fetch information 816. The read request 814 may be performed upon the read data filled within the target file (A) 810. In this way, a user may access and/or read data associated with the target file (A) 810 regardless of whether the read data has yet been migrated from the source file (A) 806 to the target file (A) 810.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 9:
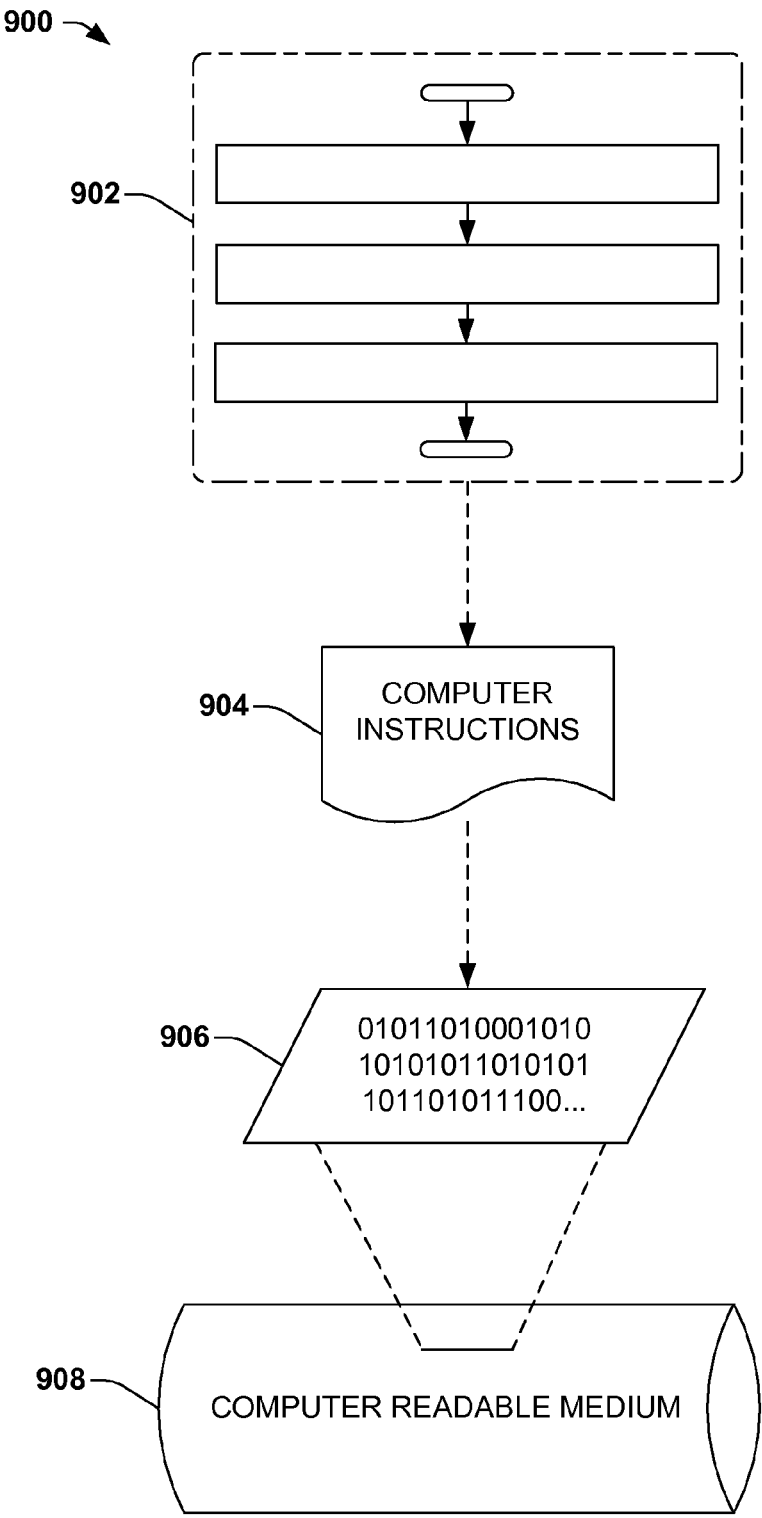
FIG. 9 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 9, where the implementation 900 comprises a computer-readable medium 908 (e.g., a CD-R, DVD-R, platter of a hard disk drive, flash drive, etc.), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902, such as at least some of the method 300 of FIG. 3 or method 400 of FIG. 4, for example, as well as at least some of a system, such as at least some of the system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for facilitating data object level on-demand operations, comprising:

receiving a request to migrate a source data object from a source location to a target location;

generating a target data object corresponding to the source data object at the target location, the target data object initially comprising less than all of the data of the source data object;

specifying a relationship between the source data object and the target data object, the relationship specifying fetch information for the source data object;

providing an indication, to a computing device, declaring that migration of the source data object to the target location as the target data object is completed, such that the target data object is exposed to the computing device for I/O access, notwithstanding the target data object comprising less than all of the data of the source data object;

providing a second indication to the computing device that the source data object is not available for I/O access from the source location after the migration is declared completed, but while the target data object comprises less than all of the data of the source data object;

responsive to receiving an I/O request, from the computing device, after the migration is declared completed, but while the target data object comprises less than all of the data of the source data object, performing an on-demand operation to satisfy the I/O request, the on-demand operation utilizing the fetch information specified by the relationship to fetch a first portion of data associated with the I/O request from the source data object not migrated to the target data object;

receiving a write request associated with the target data object while the target data object comprises less than all of the data of the source data object;

performing the write request upon the target data object to generate written data; and specifying within the relationship that migrated data from the source data object is not to overwrite the written data, at least some of the method implemented via a processor.

2. The method of claim 1, comprising:
obtaining a second portion of the data associated with the I/O request from the target data object.

3. The method of claim 1, the source data object corresponding to a source path and the target data object corresponding to a target path different than the source path.

4. The method of claim 3, the source path corresponding to a first volume and the target path corresponding to a second volume different than the first volume.

5. The method of claim 1, at least one of the receiving an I/O request or the performing an on-demand operation occurring during a non-migration state between the source data object and the target data object.

6. The method of claim 1, the request to migrate the source data object corresponding to
a source data object copy operation from the source location to the target location.

7. The method of claim 1, the request to migrate the source data object corresponding to a source data object restoration operation from the source location to the target location.

8. The method of claim 1, the source location corresponding to a first volume and the target location corresponding to a second volume different than the first volume.

9. The method of claim 1, the I/O request comprising a read request.

10. The method of claim 1, the request to migrate the source data object corresponding to a source data object move operation from the source location to the target location.

11. A method for maintaining a relationship mapping at a target location, comprising:
specifying a first relationship, between a first source data object at a first source location and a first target data object at a target location, within a relationship mapping, the first relationship indicating the first target data object comprises less than all of the data of the first source data object that is to be migrated from the first source data object to the first target data object, the first relationship comprising fetch information for the first source data object;

maintaining the first relationship within the relationship mapping based upon data migration from the first source data object to the first target data object;

providing an indication, to a computing device, declaring that migration of the first source data object to the target location as the first target data object is completed, such that the first target data object is exposed to the computing device for I/O access, notwithstanding the first target data object comprising less than all of the data of the first source data object;

providing a second indication to the computing device that the first source data object is not available for I/O access from the first source location after the migration is declared completed, but while the first target data object comprises less than all of the data of the first source data object; and responsive to receiving a first I/O request, from the computing device, while the first target data object comprises less than all of the data of the first source data object, performing an on-demand operation to satisfy the first I/O request, the on-demand operation utilizing the fetch information specified by the first relationship to fetch a first portion of data associated with the first I/O request from the first source data object not migrated to the first target data object, the on-demand operation accessing a second portion of data associated with the first I/O request from the first target data object, at least some of the method implemented via a processor.

12. The method of claim 11, the first I/O request comprising a read request.

13. The method of claim 11, comprising:
adding the first portion of data to the first target data object.

14. The method of claim 11, at least one of the receiving a first I/O request or the performing an on-demand operation occurring during a non-migration state between the first source data object and the first target data object.

15. The method of claim 11, comprising:
specifying a second relationship, between a second source data object at a second source location and a second target data object at the target location, within the relationship mapping, the second relationship indicating the second target data object comprises less than all of the data of the second source data object, the second relationship comprising fetch information for the second source data object; and maintaining the second relationship within the relationship mapping based upon data migration from the second source data object to the second target data object.

16. The method of claim 11, comprising:
specifying a third relationship, between a third source data object at the first source location and a third target data object at the target location, within the relationship mapping, the third relationship indicating the third target data object comprises less than all of the data of the third source data object, the third relationship comprising fetch information for the third source data object; and maintaining the third relationship within the relationship mapping based upon data migration from the third source data object to the third target data object.

17. The method of claim 11, the relationship mapping comprising a tree structure, the tree structure comprising source data object handles as indexes for respective relationships of the relationship mapping.

18. The method of claim 17, the tree structure comprising a B+ tree.

19. A system for facilitating data object level on-demand operations, comprising:
one or more processors; and
memory comprising instructions that when executed by at least one of the one or more processors implement at least some of:
a migration component configured to:
receive a request to migrate a source data object from a source location to a target location;
generate a target data object corresponding to the source data object at the target location, the target data object initially comprising less than all of the data of the source data object;
specify a relationship between the source data object and the target data object, the relationship specifying fetch information for the source data object;
provide an indication, to a computing device, declaring that migration of the source data object to the target location as the target data object is completed, such that the target data object is exposed for I/O access, notwithstanding the target data object comprising less than all of the data of the source data object;
provide a second indication to the computing device that the source data object is not available for I/O access from the source location after the migration is declared completed, but while the target data object comprises less than all of the data of the source data object; and
responsive to receiving an I/O request, from the computing device, after the migration is declared completed, but while the target data object comprises less than all of the data of the source data object, perform an on-demand operation to satisfy the I/O request, the on-demand operation utilizing the fetch information specified by the relationship to fetch a first portion of data associated with the I/O request from the source data object not migrated to the target data object; and
an on demand component configured:
receive a write request associated with the target data object while the target data object comprises less than all of the data of the source data object;
perform the write request upon the target data object to generate written data; and
specify within the relationship that migrated data from the source data object is not to overwrite the written data.

20. The system of claim 19, the target data object comprising a first single file and the source data object comprising a second single file.

21. The system of claim 19, the source location corresponding to a first volume and the target location corresponding to a second volume different than the first volume.

22. The system of claim 19, the I/O request comprising a read request.

23. The system of claim 19, the request to migrate the source data object corresponding to at least one of:
a source data object copy operation from the source location to the target location;
a source data object restoration operation from the source location to the target location; or
a source data object move operation from the source location to the target location.

24. A non-transitory computer readable medium comprising instructions which when executed perform a method for facilitating on-demand operations comprising:
providing an indication, to a computing device, declaring that migration of a source data object from a source location to a target location as a target data object is completed, such that the target data object is exposed to the computing device for I/O access, notwithstanding the target data object comprising less than all of the data of the source data object;
providing a second indication to the computing device that the source data object is not available for I/O access from the source location after the migration is declared completed, but while the target data object comprises less than all of the data of the source data object;
receiving a request, from the computing device, to access a portion of the target data object while the target data object comprises less than all of the data of the source data object;
responsive to determining that the requested portion corresponds to a read request, then:
consulting a relationship associated with the migration between the source data object and the target data object to determine a source path of the source data object; and
performing an on-demand operation to retrieve data from the source data object using the source path to satisfy the read request:
responsive to determining that the requested portion corresponds to a write request, then:
performing the write request upon the target data object to generate written data; and
specifying within the relationship that migrated data from the source data object is not to overwrite the written data.

25. The non-transitory computer readable medium of claim 24, the source location corresponding to a first volume.

26. The non-transitory computer readable medium of claim 25, the target location corresponding to a second volume different than the first volume.

27. The non-transitory computer readable medium of claim 24, the relationship comprising at least one of a host identifier of the source location, an IP address of the source location, or a computing device identifier of the source location.

* * * * *